United States Patent
Song et al.

(12) 
(10) Patent No.: US 11,884,222 B1
(45) Date of Patent: Jan. 30, 2024

(54) ADAPTIVE ENERGY ABSORPTION MODULE AND VEHICLE BUMPER ASSEMBLY

(71) Applicant: Toyota Motor Engineering & Manufacturing North America, Inc., Plano, TX (US)

(72) Inventors: Yuyang Song, Ann Arbor, MI (US); Umesh Gandhi, Farmington hills, MI (US); Danil Prokhorov, Canton, MI (US); Phouvadol Khouphongsy, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aich-ken (JP)

( * ) Notice: Subject to any disclaimer, the term of this patent is extended or adjusted under 35 U.S.C. 154(b) by 0 days.

(21) Appl. No.: 17/860,458

(22) Filed: Jul. 8, 2022

(51) Int. Cl.
  *B60R 19/20* (2006.01)
  *B60R 19/18* (2006.01)

(52) U.S. Cl.
  CPC ...... *B60R 19/20* (2013.01); *B60R 2019/1806* (2013.01)

(58) Field of Classification Search
  CPC ....... B60R 19/02; B60R 19/023; B60R 19/18; B60R 19/20; B60R 19/32
  USPC .................................. 296/107, 110
  See application file for complete search history.

(56) References Cited

U.S. PATENT DOCUMENTS

| | | | | |
|---|---|---|---|---|
| 10,099,639 | B1 * | 10/2018 | Faruque | B60R 19/18 |
| 2018/0281714 | A1 * | 10/2018 | Gandhi | B60R 19/18 |

FOREIGN PATENT DOCUMENTS

| | | | |
|---|---|---|---|
| CN | 102975674 A | | 3/2013 |
| CN | 202987032 U | | 4/2015 |
| CN | 204296626 U | | 4/2015 |
| CN | 108909663 A | * | 11/2018 |
| CN | 109204203 A | | 1/2019 |
| CN | 109572603 A | * | 4/2019 |
| CN | 209079840 U | | 7/2019 |
| CN | 213768463 U | | 7/2021 |
| WO | 2019043260 A1 | | 3/2019 |

* cited by examiner

*Primary Examiner* — Jason S Daniels
(74) *Attorney, Agent, or Firm* — Jordan IP Law, LLC

(57) ABSTRACT

A vehicle bumper assembly includes an adaptive energy absorption module operatively connected to a vehicle bumper body. The adaptive energy absorption module includes a primary deformable impact absorber member defining a primary impact chamber having a shape that is structurally adaptive or otherwise conforms to an impact force received by the bumper body. A secondary deformable impact absorber member is arranged in the primary impact chamber and defines a secondary impact chamber containing a shear thickening fluid that exhibits a decreasing viscosity responsive to the impact force. A plurality of fluidically connected tertiary deformable impact absorber members are arranged in an array the primary impact chamber and defines a plurality of tertiary impact chambers containing a volume of fluid, and has a shape that is structurally adaptive to the impact force.

20 Claims, 8 Drawing Sheets

ADAPTIVE ENERGY ABSORPTION MODULE AND VEHICLE BUMPER ASSEMBLY

TECHNICAL FIELD

One or more embodiments relate generally to an adaptive energy absorption module for a vehicle, a vehicle bumper having such an adaptive energy absorption module, and a vehicle having such a vehicle bumper.

BACKGROUND

Contemporary vehicles are equipped with energy absorption modules mounted to the front region of the vehicle frame for dampening the effects of an impact force applied to a front region of the vehicle. In particular, such energy absorption systems are designed to absorb the impact energy.

BRIEF SUMMARY

An adaptive energy absorption module for a vehicle, a vehicle bumper having such an adaptive energy absorption module, and a vehicle having such a vehicle bumper are provided herein to dampen the effects of an impact force applied to a front region of the vehicle.

In accordance with one or more embodiments, an example vehicle bumper assembly comprises one or more of the following: a bumper body; and an adaptive energy absorption module operatively connected to the bumper body, the adaptive energy absorption module including: a first/primary deformable impact absorber member defining a first/primary impact chamber having a shape that is structurally adaptive or otherwise conforms to an impact force received by the bumper body; a second/secondary deformable impact absorber member arranged in the first/primary impact chamber and itself defining a second/secondary impact chamber containing a shear thickening fluid that exhibits a decreasing viscosity responsive to the impact force, and a plurality of fluidically connected third/tertiary deformable impact absorber members arranged in the first/primary impact chamber and itself defining a plurality of third/tertiary impact chambers containing a volume of fluid such as gas or air, and having a shape that is structurally adaptive to the impact force.

In accordance with one or more embodiments, an example vehicle bumper assembly comprises one or more of the following: a bumper body; and an adaptive energy absorption module operatively connected to the bumper body, the adaptive energy absorption module including: a second/secondary deformable impact absorber member arranged in a first/primary impact chamber and itself defining a second/secondary impact chamber containing a shear thickening fluid that exhibits a decreasing viscosity responsive to the impact force, and a plurality of fluidically connected third/tertiary deformable impact absorber members arranged in the first/primary impact chamber and itself defining a plurality of third/tertiary impact chambers containing a volume of fluid such as gas or air, and having a shape that is structurally adaptive to the impact force.

In accordance with the example vehicle bumper assembly, the first/primary deformable impact absorber member is composed of a nanofabric material. The nanofabric material comprises kevlar fabric or nylon fabric.

In accordance with the example vehicle bumper assembly, the second/secondary deformable impact absorber member is composed of a nanofabric material. The nanofabric material comprises kevlar fabric or nylon fabric coated with silicon or thermoplastic polyurethane (TPU).

In accordance with the example vehicle bumper assembly, the shear thickening fluid comprises a mixture of polyethylene glycol (PEG) having silica nanoparticles.

In accordance with the example vehicle bumper assembly, each third/tertiary deformable impact absorber member is composed of an inflatable nanofabric material. The nanofabric material comprises kevlar fabric or nylon fabric coated with silicon or TPU.

In accordance with the example vehicle bumper assembly, each of the third/tertiary deformable impact absorber members have a spherical shape or cross-section.

In accordance with the example vehicle bumper assembly, the third/tertiary deformable impact absorber members are arranged in an array comprising a plurality of rows and a plurality of columns. In one example embodiment, the third/tertiary deformable impact absorber members in adjacent rows are composed of different materials based on impact resistance.

In accordance with the example vehicle bumper assembly, one or more channel members are operable to fluidically connect adjacent third/tertiary deformable impact absorber members in a row. In that way, the one or more channel members are operable to redistribute air or gas between adjacent rows of the third/tertiary deformable impact absorber members in response to the impact force.

In accordance with the example vehicle bumper assembly, one or more channel members are operable to fluidically connect adjacent third/tertiary deformable impact absorber members in a column. The one or more channel members are operable to redistribute air or gas between adjacent columns of the third/tertiary deformable impact absorber members in response to the impact force.

In accordance with one or more embodiments, an example adaptive energy absorption module comprises one or more of the following: a first/primary deformable impact absorber member defining a first/primary impact chamber having a shape that is structurally adaptive or otherwise conforms to an impact force received by the bumper body; a second/secondary deformable impact absorber member arranged in the first/primary impact chamber and itself defining a second/secondary impact chamber containing a shear thickening fluid that exhibits a decreasing viscosity responsive to the impact force, and a plurality of fluidically connected third/tertiary deformable impact absorber members arranged in the first/primary impact chamber and itself defining a plurality of third/tertiary impact chambers containing a volume of fluid such as gas or air, and having a shape that is structurally adaptive to the impact force.

In accordance with one or more embodiments, an example adaptive energy absorption module comprises one or more of the following: a second/secondary deformable impact absorber member arranged in a first/primary impact chamber and itself defining a second/secondary impact chamber containing a shear thickening fluid that exhibits a decreasing viscosity responsive to the impact force, and a plurality of fluidically connected third/tertiary deformable impact absorber members arranged in the first/primary impact chamber and itself defining a plurality of third/tertiary impact chambers containing a volume of fluid such as gas or air, and having a shape that is structurally adaptive to the impact force.

In accordance with the example adaptive energy absorption module, the first/primary deformable impact absorber member is composed of a nanofabric material. The nanofabric material comprises kevlar fabric or nylon fabric.

In accordance with the example adaptive energy absorption module, the second/secondary deformable impact absorber member is composed of a nanofabric material. The nanofabric material comprises kevlar fabric or nylon fabric coated with silicon or thermoplastic polyurethane (TPU).

In accordance with the example adaptive energy absorption module, the shear thickening fluid comprises a mixture of polyethylene glycol (PEG) having silica nanoparticles.

In accordance with the example adaptive energy absorption module, each third/tertiary deformable impact absorber member is composed of an inflatable nanofabric material. The nanofabric material comprises kevlar fabric or nylon fabric coated with silicon or TPU.

In accordance with the example adaptive energy absorption module, each of the third/tertiary deformable impact absorber members have a spherical shape or cross-section.

In accordance with the example adaptive energy absorption module, the third/tertiary deformable impact absorber members are arranged in an array comprising a plurality of rows and a plurality of columns. In one example embodiment, the third/tertiary deformable impact absorber members in adjacent rows are composed of different materials based on impact resistance.

In accordance with the example adaptive energy absorption module, one or more channel members are operable to fluidically connect adjacent third/tertiary deformable impact absorber members in a row. In that way, the one or more channel members are operable to redistribute air or gas between adjacent rows of the third/tertiary deformable impact absorber members in response to the impact force.

In accordance with the example adaptive energy absorption module, one or more channel members are operable to fluidically connect adjacent third/tertiary deformable impact absorber members in a column. The one or more channel members are operable to redistribute air or gas between adjacent columns of the third/tertiary deformable impact absorber members in response to the impact force.

In accordance with one or more embodiments, an example vehicle comprises one or more of the following: a bumper body; and an adaptive energy absorption module operatively connected to the bumper body, the adaptive energy absorption module including: a first/primary deformable impact absorber member defining a first/primary impact chamber having a shape that is structurally adaptive or otherwise conforms to an impact force received by the bumper body, a second/secondary deformable impact absorber member arranged in the primary impact chamber and itself defining a second/secondary impact chamber containing a shear thickening fluid that exhibits a decreasing viscosity responsive to the impact force, and a plurality of fluidically connected third/tertiary deformable impact absorber members arranged in the first/primary impact chamber and itself defining a plurality of third/tertiary impact chambers containing a volume of fluid such as gas or air, and having a shape that is structurally adaptive to the impact force.

In accordance with one or more embodiments, an example vehicle comprises one or more of the following: a bumper body; and an adaptive energy absorption module operatively connected to the bumper body, the adaptive energy absorption module including: a second/secondary deformable impact absorber member arranged in a primary impact chamber and itself defining a second/secondary impact chamber containing a shear thickening fluid that exhibits a decreasing viscosity responsive to the impact force, and a plurality of fluidically connected third/tertiary deformable impact absorber members arranged in the first/primary impact chamber and itself defining a plurality of third/tertiary impact chambers containing a volume of fluid such as gas or air, and having a shape that is structurally adaptive to the impact force.

In accordance with the example vehicle, the first/primary deformable impact absorber member is composed of a nanofabric material. The nanofabric material comprises kevlar fabric or nylon fabric.

In accordance with the example vehicle, the second/secondary deformable impact absorber member is composed of a nanofabric material. The nanofabric material comprises kevlar fabric or nylon fabric coated with silicon or TPU.

In accordance with the example vehicle, the shear thickening fluid comprises a mixture of PEG having silica nanoparticles.

In accordance with the example vehicle, each third/tertiary deformable impact absorber member is composed of an inflatable nanofabric material. The nanofabric material comprises kevlar fabric or nylon fabric coated with silicon or TPU.

In accordance with the example vehicle, each of the third/tertiary deformable impact absorber members have a spherical shape or cross-section.

In accordance with the example vehicle, the third/tertiary deformable impact absorber members are arranged in an array comprising a plurality of rows and a plurality of columns. In one example embodiment, the third/tertiary deformable impact absorber members in adjacent rows are composed of different materials based on impact resistance.

In accordance with the example vehicle, one or more channel members are operable to fluidically connect adjacent third/tertiary deformable impact absorber members in a row. In that way, the one or more channel members are operable to redistribute air or gas between adjacent rows of the third/tertiary deformable impact absorber members in response to the impact force.

In accordance with the example vehicle, one or more channel members are operable to fluidically connect adjacent third/tertiary deformable impact absorber members in a column. The one or more channel members are operable to redistribute air or gas between adjacent columns of the third/tertiary deformable impact absorber members in response to the impact force.

BRIEF DESCRIPTION OF THE SEVERAL VIEWS OF THE DRAWINGS

The various advantages of the exemplary embodiments will become apparent to one skilled in the art by reading the following specification and appended claims, and by referencing the following drawings, in which:

DETAILED DESCRIPTION

Turning to the figures, which illustrates a vehicle 100, in accordance with one or more embodiments. In accordance with one or more embodiments, a "vehicle" may be in reference to any form of motorized transport. In accordance with one or more embodiments, the vehicle 100 may comprise an automobile. Embodiments, however, are not limited thereto, and thus, the vehicle 100 may comprise a watercraft, an aircraft, or any other form of transport vehicle.

The vehicle 100 may comprise an electric vehicle (EV), a hybrid electric vehicle (HEV), a plug-in hybrid electric vehicle (PHEV), a battery electric vehicle (BEV), and a fuel cell electric vehicle (FCEV).

Figure 1:
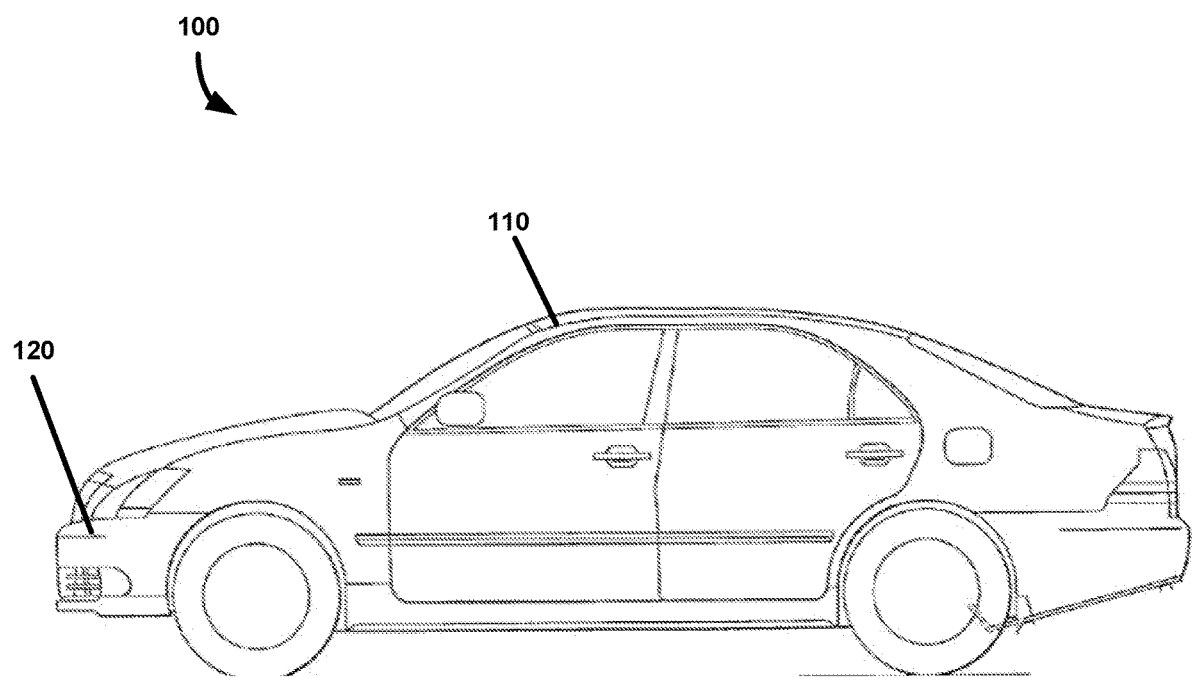
FIG. 1 illustrates an example of a vehicle operable to include an adaptive energy absorption module, in accordance with one or more embodiments set forth, shown, and described herein.

The vehicle 100 may comprise one or more operational elements, some of which may be a part of an autonomous driving system. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

The vehicle 100 may not include one or more of the elements shown in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

As illustrated in FIG. 1, the example vehicle 100 comprises a vehicle body 110 having a bumper assembly 120 operable to dampen the effects of an impact force, such as one that is applied to a front region of the vehicle 100. The bumper assembly 120 includes an adaptive energy absorption module that serves as a bumper reinforcement member that is connected to a bumper body 130.

As illustrated in FIGS. 2 through 7, the adaptive energy absorption module includes a first or primary deformable impact absorber member 121, a second or secondary deformable impact absorber member 122, and plurality of fluidically connected third or tertiary deformable impact absorber members 125.

Primary Deformable Impact Absorber Member

Figure 4:
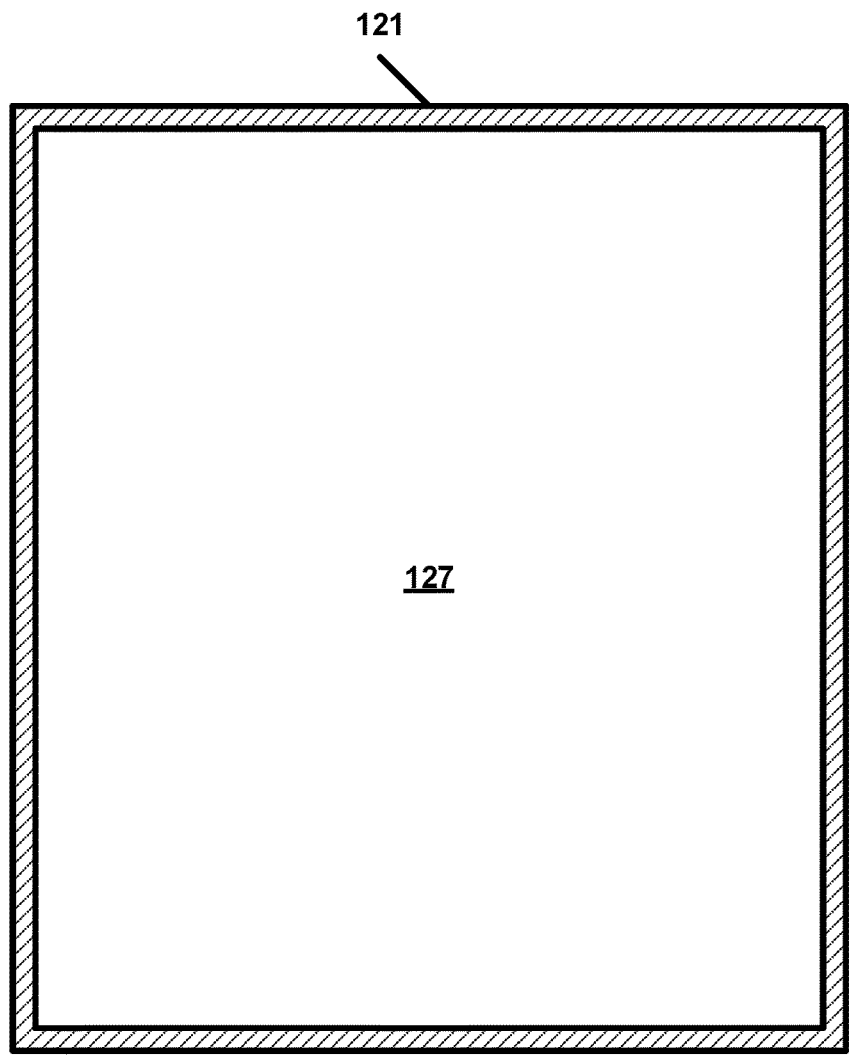
FIG. 4 illustrates a top view of a primary deformable impact absorber member of an adaptive energy absorption module.

As illustrated in FIG. 4, the primary deformable impact absorber member 121 defines a primary impact chamber 127. The primary deformable impact absorber member 121, and thus, the primary impact chamber 127, has a shape that is structurally adaptive or otherwise conforms to an impact force. The primary deformable impact absorber member 121 may be composed of a durable, lightweight material having high impact resistance. The material may comprise, for example, a nanofabric material that may be uncoated or coated with one or more coats to enhance the operational performance of the primary deformable impact absorber member 121. In one example embodiment, the nanofabric material comprises Kevlar fibers. In another example embodiment, the nanofabric material comprises nylon fibers. Embodiments, however, are not limited thereto, and thus, this disclosure contemplates the primary deformable impact absorber member 121 being composed of any suitable material that falls within the spirit and scope of the principles of this disclosure.

Secondary Deformable Impact Absorber Member

Figure 2:
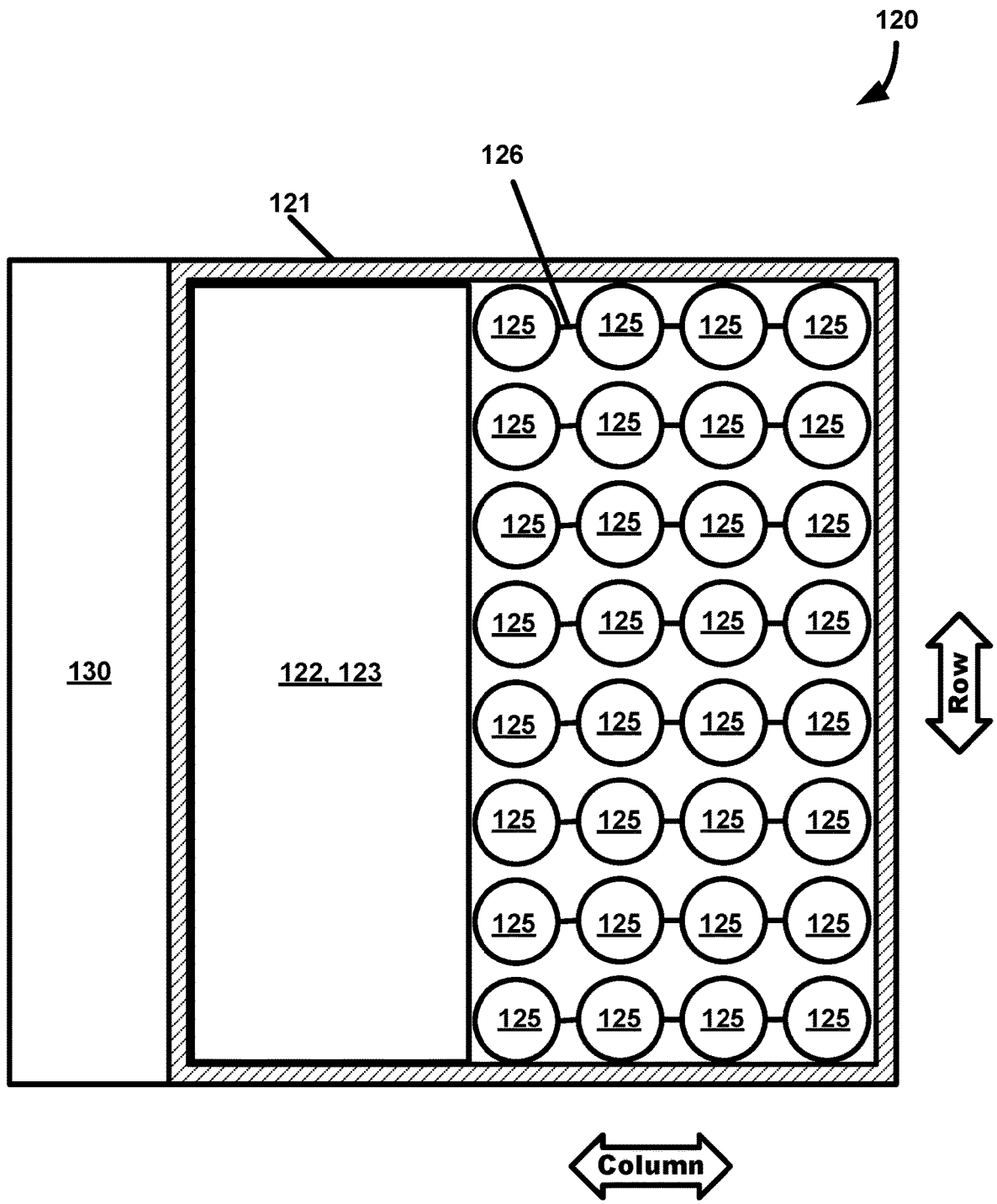
FIG. 2 illustrates a top view of an adaptive energy absorption module, in accordance with an embodiment set forth, shown, and described herein.
Figure 3:
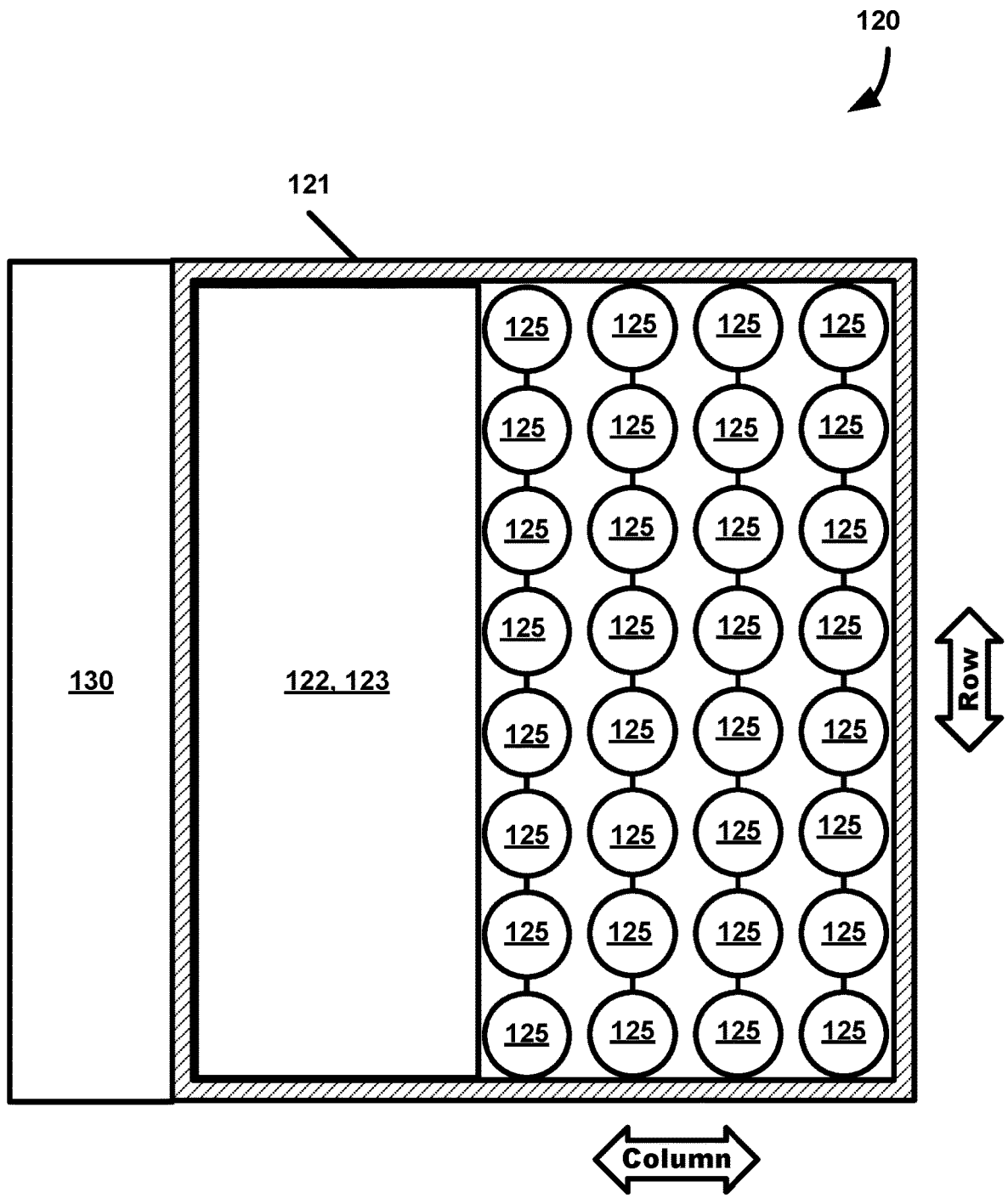
FIG. 3 illustrates a top view of an adaptive energy absorption module, in accordance with an embodiment set forth, shown, and described herein.
Figure 5:
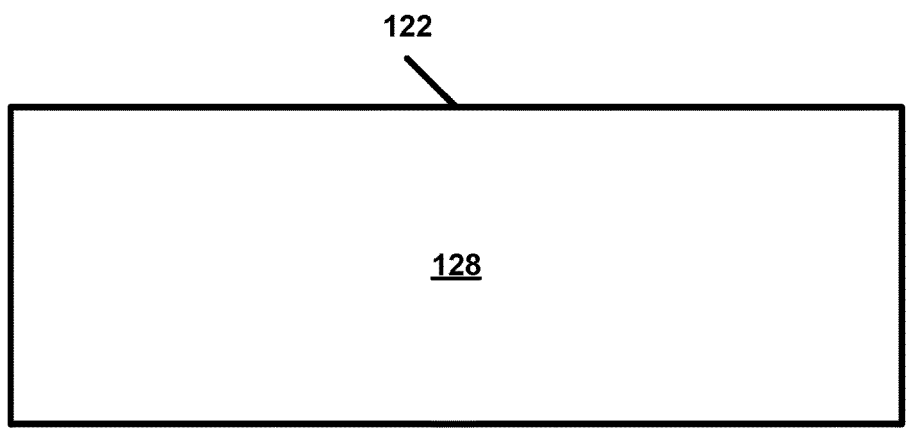
FIG. 5 illustrates a top view of a secondary deformable impact absorber member of an adaptive energy absorption module.

As illustrated in FIGS. 2, 3, and 5, the secondary deformable impact absorber member 122 is arranged in the primary impact chamber 127. The secondary deformable impact absorber member 122 defines a secondary impact chamber 128 to contain a volume of shear thickening fluid 123 that exhibits an increasing or decreasing viscosity responsive to an impact force. The shear thickening fluid 123 is fluidic and exhibits a decreasing viscosity responsive to an impact force that is less than a predetermined shear rate. The shear thickening fluid stiffens 123 to a solid-like state and exhibits an increasing viscosity responsive to an impact force that is greater than the predetermined shear rate. The shear thickening fluid may comprise a mixture of polyethylene glycol (PEG) having silica nanoparticles.

The secondary deformable impact absorber member 122 may be composed of a durable, lightweight material having high impact resistance. The material may comprise, for example, a nanofabric material that may be uncoated or coated with one or more coats to enhance the operational performance of the primary deformable impact absorber member 121. In one example embodiment, the nanofabric material comprises Kevlar fibers coated with silicon or thermoplastic polyurethane (TPU). In another example embodiment, the nanofabric material comprises nylon fibers coated with silicon or TPU. This disclosure contemplates the secondary deformable impact absorber member 122 being composed of any suitable material that falls within the spirit and scope of the principles of this disclosure.

Tertiary Deformable Impact Absorber Member

Figure 6:
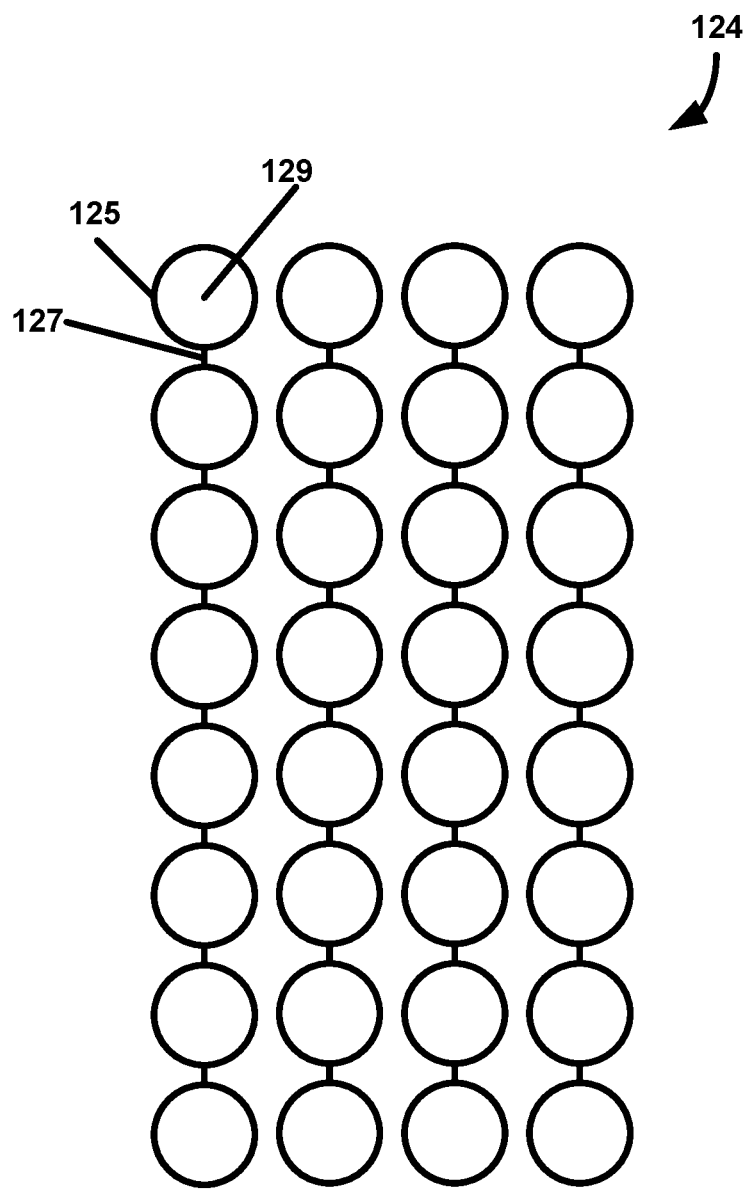
FIG. 6 illustrates a top view of an array of tertiary deformable impact absorber members of an adaptive energy absorption module.
Figure 7:
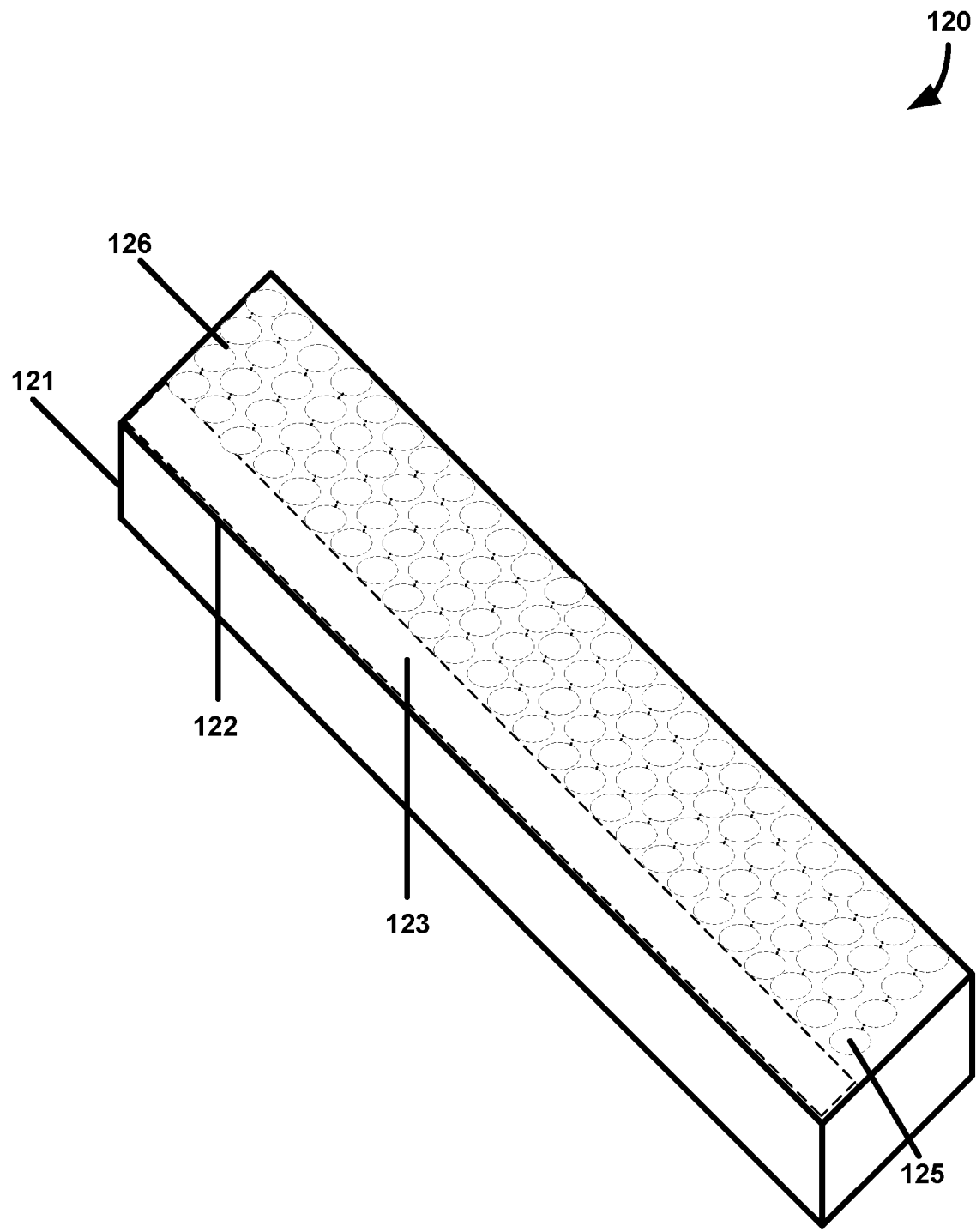
FIG. 7 illustrates a perspective view of an adaptive energy absorption module, in accordance with an embodiment set forth, shown, and described herein.

As illustrated in FIGS. 2, 3, and 6, the tertiary deformable impact absorber members 125 are arranged in the primary impact chamber 127 in an array 124 comprising a plurality of rows and a plurality of columns. From a front to back in a longitudinal direction of the vehicle body 110, the array 124 of tertiary deformable impact absorber members 125 are arranged behind the secondary deformable impact absorber member 122.

Each tertiary deformable impact absorber member 125 defines a tertiary impact chamber 129 containing a volume of fluid such as gas or air. One or more channel members 126 are operable to fluidically connect adjacent tertiary deformable impact absorber members 125 in a column (FIG. 2). Alternatively, one or more channel members 126 are operable to fluidically connect adjacent tertiary deformable impact absorber members 125 in a row (FIG. 3). The one or more channel members 126 are operable to redistribute air or gas between adjacent rows or adjacent columns of the tertiary deformable impact absorber members 125 in response to an impact force. The one or more channel members 126 may be composed of a durable, lightweight material having high impact resistance.

Each tertiary deformable impact absorber member 125 may be composed of a durable, lightweight material having high impact resistance. The material may comprise, for example, a nanofabric material that may be uncoated or coated with one or more coats to enhance the operational performance of the primary deformable impact absorber member 121. In one example embodiment, the nanofabric material comprises Kevlar fibers coated with silicon or thermoplastic polyurethane (TPU). In another example embodiment, the nanofabric material comprises nylon fibers coated with silicon or TPU. This disclosure contemplates the tertiary deformable impact absorber members 125 being composed of any suitable material that falls within the spirit and scope of the principles of this disclosure.

In one or more example embodiments, the tertiary deformable impact absorber members 125 in adjacent rows may be composed of different materials based on impact resistance. For example, a row of tertiary deformable impact absorber members 125 may be composed of a material that has a greater (or lesser) impact resistance that a row that immediately follows. Alternatively, or additionally, the tertiary deformable impact absorber members 125 may have a greater (or lesser) impact resistance based on a predetermined region in the array 124.

Each tertiary deformable impact absorber member 125 has a shape or cross-section that is structurally adaptive to an impact force. Although the example embodiments illustrate the tertiary deformable impact absorber members 125 having a spherical shape or cross-section, embodiments are not limited thereto. This disclosure contemplates the tertiary deformable impact absorber members 125 having any suitable geometric configuration that falls within the spirit and scope of the principles of this disclosure.

Figure 8:
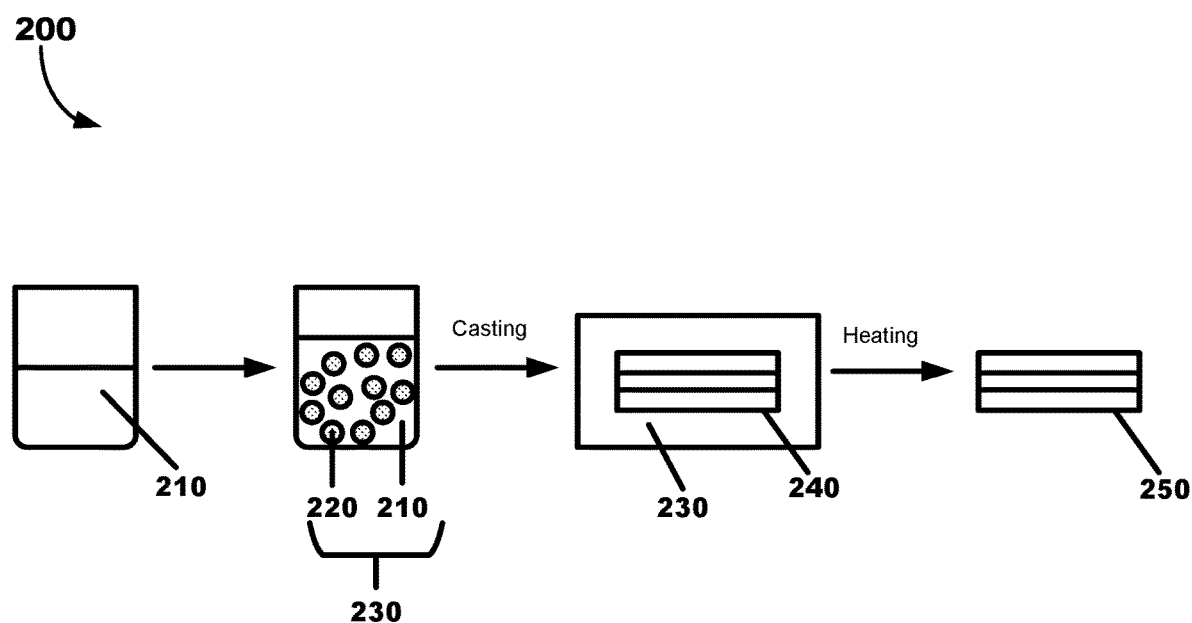
FIG. 8 illustrates a method of manufacturing a hybrid fabric for the adaptive energy absorption module, in accordance with another embodiment set forth, shown, and described herein.

As illustrated in FIG. 8, a process 200 for manufacturing a hybrid fabric includes adding silica nanoparticles 220 to a PEG solution 210 to obtain a shear thickening fluid. A fabric material 240 is then immersed in the PEG solution 210 containing silica nanoparticles 220, which results in an impregnation of the fabric material becomes with the shear thickening fluid. The now impregnated fabric material 240 is removed from the PEG solution 210 containing silica nanoparticles 220, and then dried to obtain a final hybrid fabric material 250.

Figure 9:
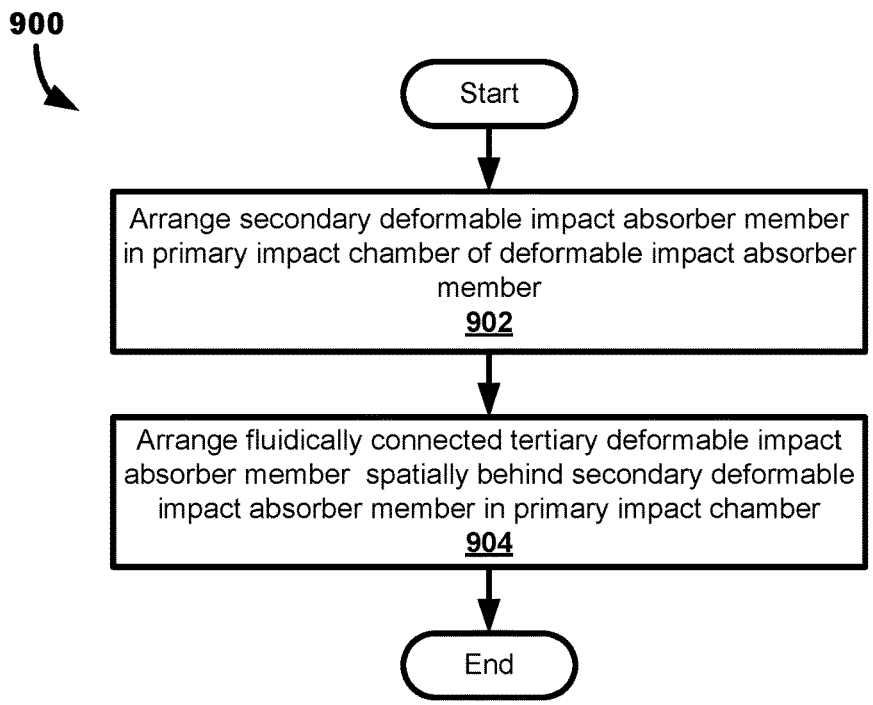
FIGS. 9 and 10 respectively illustrate a flowchart of an example method of manufacturing a vehicle.
Figure 10:
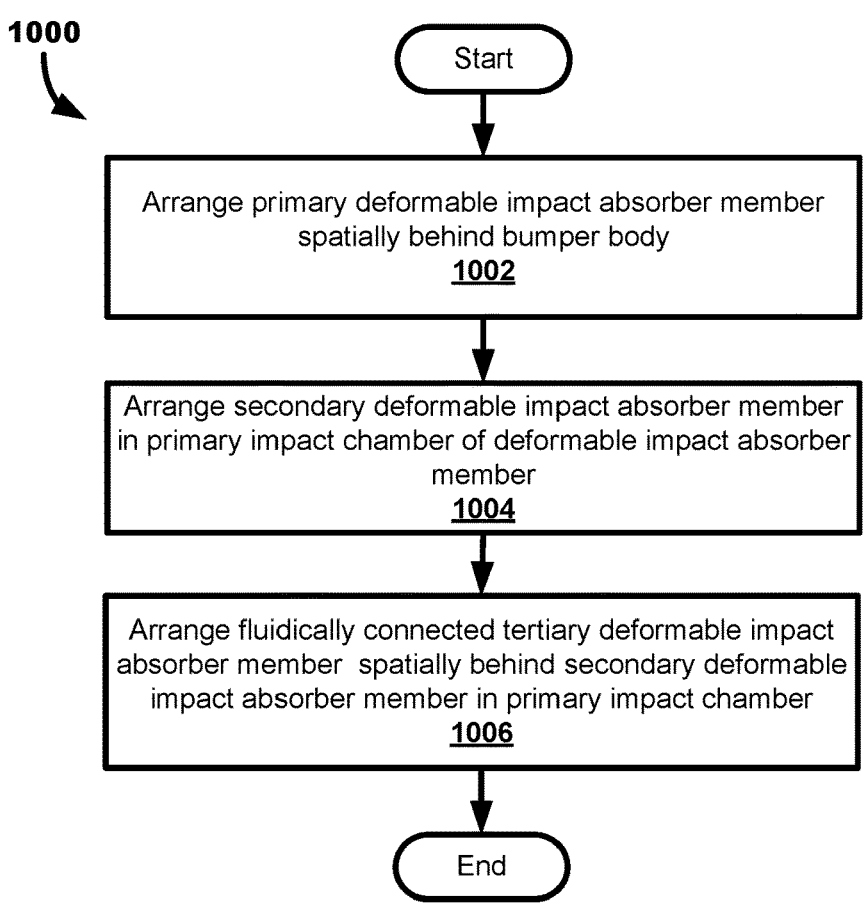

Illustrated the examples of FIGS. 9 and 10 set forth example methods 900 and 1000 of manufacturing a vehicle.

In the illustrated example embodiment of FIG. 9, illustrated process block 902 includes arranging a secondary deformable impact absorber member in a primary impact chamber, the secondary deformable impact absorber member defining a secondary impact chamber containing a shear thickening fluid that exhibits a decreasing viscosity responsive to an impact force.

The method 900 then proceeds to process block 904, which includes arranging a plurality of fluidically connected tertiary deformable impact absorber members in the primary impact chamber, each tertiary deformable impact absorber member defining a tertiary impact chamber containing a volume of fluid such as gas or air, and has a shape that is structurally adaptive to the impact force.

In accordance with process block 904, the tertiary deformable impact absorber members are arranged in an array comprising a plurality of rows and a plurality of columns.

In accordance with process block 904, the tertiary deformable impact absorber members in adjacent rows are composed of different materials based on impact resistance.

In accordance with process block 904, adjacent tertiary deformable impact absorber members in a row are fluidically connected via one or more channel members.

In accordance with process block 904, the one or more channel members are operable to redistribute the fluid in individual tertiary deformable impact absorber members between adjacent rows of tertiary deformable impact absorber members in response to the impact force.

In accordance with process block 904, adjacent tertiary deformable impact absorber members in a column are fluidically connected via one or more channel members.

In accordance with process block 904, the one or more channel members are operable to redistribute the fluid in individual tertiary deformable impact absorber members between adjacent columns of tertiary deformable impact absorber members in response to the impact force.
5555555

In the illustrated example embodiment of FIG. 10, illustrated process block 1002 includes arranging a primary deformable impact absorber member spatially behind a bumper body, the primary deformable impact absorber member defining a primary impact chamber having a shape that is structurally adaptive or otherwise conforms to an impact force received by the bumper body.

The method 1000 then proceeds to process block 1004, which includes arranging a secondary deformable impact absorber member in the primary impact chamber, the secondary deformable impact absorber member defining a secondary impact chamber containing a shear thickening fluid that exhibits a decreasing viscosity responsive to an impact force.

The method 1000 then proceeds to process block 1006, which includes arranging a plurality of fluidically connected tertiary deformable impact absorber members in the primary impact chamber, each tertiary deformable impact absorber member defining a tertiary impact chamber containing a volume of fluid such as gas or air, and has a shape that is structurally adaptive to the impact force.

In accordance with process block 1006, the tertiary deformable impact absorber members are arranged in an array comprising a plurality of rows and a plurality of columns.

In accordance with process block 1006, the tertiary deformable impact absorber members in adjacent rows are composed of different materials based on impact resistance.

In accordance with process block 1006, adjacent tertiary deformable impact absorber members in a row are fluidically connected via one or more channel members.

In accordance with process block 1006, the one or more channel members are operable to redistribute the fluid in individual tertiary deformable impact absorber members between adjacent rows of tertiary deformable impact absorber members in response to the impact force.

In accordance with process block 1006, adjacent tertiary deformable impact absorber members in a column are fluidically connected via one or more channel members.

In accordance with process block 1006, the one or more channel members are operable to redistribute the fluid in individual tertiary deformable impact absorber members between adjacent columns of tertiary deformable impact absorber members in response to the impact force.

The computer-implemented method 1000 can terminate or end after execution of illustrated process block 1006.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle bumper assembly, comprising:
   a bumper body; and
   an adaptive energy absorption module operatively connected to the bumper body, the adaptive energy absorption module including:
   a primary deformable impact absorber member defining a primary impact chamber having a shape that is structurally adaptive to an impact force received by the bumper body,
   a secondary deformable impact absorber member arranged in the primary impact chamber and itself defining a secondary impact chamber containing a shear thickening fluid that exhibits a decreasing viscosity responsive to the impact force, and
   a plurality of fluidically connected tertiary deformable impact absorber members arranged in the primary impact chamber and itself defining a plurality of tertiary impact chambers containing a volume of fluid, and having a shape that is structurally adaptive to the impact force.

2. The vehicle bumper assembly of claim 1, wherein the tertiary deformable impact absorber members are arranged in an array comprising a plurality of rows and a plurality of columns.

3. The vehicle bumper assembly of claim 2, wherein the tertiary deformable impact absorber members in adjacent rows are composed of different materials based on impact resistance.

4. The vehicle bumper assembly of claim 2, further comprising one or more channel members operable to fluidically connect adjacent tertiary deformable impact absorber members in a row.

5. The vehicle bumper assembly of claim 4, wherein the one or more channel members are operable to redistribute the fluid between adjacent rows of the tertiary deformable impact absorber members in response to the impact force.

6. The vehicle bumper assembly of claim 2, further comprising one or more channel members operable to fluidically connect adjacent tertiary deformable impact absorber members in a column.

7. The vehicle bumper assembly of claim 6, wherein the one or more channel members are operable to redistribute air or gas between adjacent columns of the tertiary deformable impact absorber members in response to the impact force.

8. An adaptive energy absorption module for a vehicle bumper assembly, the adaptive energy absorption module comprising:
   a primary deformable impact absorber member defining a first/primary impact chamber having a shape that is structurally adaptive or otherwise conforms to an impact force received by a bumper body of the vehicle bumper assembly;
   a secondary deformable impact absorber member arranged in the primary impact chamber and itself defining a secondary impact chamber containing a shear thickening fluid that exhibits a decreasing viscosity responsive to the impact force; and
   a plurality of fluidically connected tertiary deformable impact absorber members arranged in the primary impact chamber and itself defining a plurality of tertiary impact chambers containing a volume of fluid, and having a shape that is structurally adaptive to the impact force.

9. The adaptive energy absorption module of claim 8, wherein the tertiary deformable impact absorber members are arranged in an array comprising a plurality of rows and a plurality of columns.

10. The adaptive energy absorption module of claim 9, wherein the tertiary deformable impact absorber members in adjacent rows are composed of different materials based on impact resistance.

11. The adaptive energy absorption module of claim 9, further comprising one or more channel members operable to fluidically connect adjacent tertiary deformable impact absorber members in a row.

12. The adaptive energy absorption module of claim 11, wherein the one or more channel members are operable to redistribute the fluid between adjacent rows of the tertiary deformable impact absorber members in response to the impact force.

13. The adaptive energy absorption module of claim 9, further comprising one or more channel members operable to fluidically connect adjacent tertiary deformable impact absorber members in a column.

14. The vehicle bumper assembly of claim 13, wherein the one or more channel members are operable to redistribute air or gas between adjacent columns of the tertiary deformable impact absorber members in response to the impact force.

15. A vehicle, comprising:
    a bumper body; and
    an adaptive energy absorption module operatively connected to the bumper body, the adaptive energy absorption module including:
    a primary deformable impact absorber member defining a first/primary impact chamber having a shape that is structurally adaptive or otherwise conforms to an impact force received by the bumper body,
    a secondary deformable impact absorber member arranged in the primary impact chamber and itself defining a secondary impact chamber containing a shear thickening fluid that exhibits a decreasing viscosity responsive to the impact force, and
    a plurality of fluidically connected tertiary deformable impact absorber members arranged in the primary impact chamber and itself defining a plurality of tertiary impact chambers containing a volume of fluid, and having a shape that is structurally adaptive to the impact force.

16. The vehicle of claim 15, wherein the tertiary deformable impact absorber members are arranged in an array comprising a plurality of rows and a plurality of columns.

17. The vehicle of claim 16, wherein the tertiary deformable impact absorber members in adjacent rows are composed of different materials based on impact resistance.

18. The vehicle of claim 16, further comprising one or more channel members operable to fluidically connect adjacent tertiary deformable impact absorber members in a row.

19. The vehicle of claim 18, wherein the one or more channel members are operable to redistribute the fluid between adjacent rows of the tertiary deformable impact absorber members in response to the impact force.

20. The vehicle of claim 16, further comprising one or more channel members operable to fluidically connect adjacent tertiary deformable impact absorber members in a column.

\* \* \* \* \*